(12) United States Patent
Levy et al.

(10) Patent No.: US 8,804,128 B2
(45) Date of Patent: Aug. 12, 2014

(54) INTERFEROMETER WITH A SPACE-VARIANT POLARIZATION CONVERTER TO PRODUCE RADIALLY AND AZIMUTHALLY POLARIZED BEAMS

(75) Inventors: Uriel Levy, Kiriat Ono (IL); Gilad Lerman, Jerusalem (IL)

(73) Assignee: Yissum Research Development Compan of the Hebrew University of Jerusalem, Ltd., Jerusalem (IL)

( * ) Notice: Subject to any disclaimer, the term of this patent is extended or adjusted under 35 U.S.C. 154(b) by 190 days.

(21) Appl. No.: 13/511,214

(22) PCT Filed: Nov. 30, 2010

(86) PCT No.: PCT/IL2010/001002
§ 371 (c)(1),
(2), (4) Date: May 22, 2012

(87) PCT Pub. No.: WO2011/064785
PCT Pub. Date: Jun. 3, 2011

(65) Prior Publication Data
US 2012/0236315 A1    Sep. 20, 2012

Related U.S. Application Data

(60) Provisional application No. 61/264,962, filed on Nov. 30, 2009.

(51) Int. Cl.
*G01B 9/02*    (2006.01)
(52) U.S. Cl.
USPC .......................................................... 356/491
(58) Field of Classification Search
CPC .................. G01J 2009/0265; G01J 2009/0261; G01B 2290/70
USPC .................................. 356/487, 488, 491–495
See application file for complete search history.

(56) References Cited

U.S. PATENT DOCUMENTS 7,289,222 B1 * 10/2007 Schuster ....................... 356/495

OTHER PUBLICATIONS

V. Greco et al., "Accurate polarization interferometer," Review of Scientific Instruments, Jul. 1995, pp. 3729-3734, vol. 66, No. 7, USA.
Q. Zhan et al., "Interferometric measurement of the geometric phase in space-variant polarization manipulations," Opt. Comm., Oct. 17, 2002, pp. 241-245, vol. 213.
G.M. Lerman et al., "Radial polarization interferometer," Optics Express, Dec. 7, 2009, pp. 23234-23246, vol. 17, No. 25, USA.

(Continued)

*Primary Examiner* — Hwa Lee
(74) *Attorney, Agent, or Firm* — Oliff PLC

(57) ABSTRACT

An interferometer includes an optical assembly for directing an input optical field, a space-variant polarization converter, and an analyzer. The optical assembly is configured and operable to produce first and second spatially separated optical fields of incident coherent radiation of substantially the same intensity and different polarizations and to define first and second spatially separated optical paths for propagation of said first and second optical fields thereby allowing interaction between the first optical field and an element affecting a phase thereof in said first optical path. The space-variant polarization converter is accommodated in said combined path and being configured and operable to simultaneously apply space-variant polarization conversion to two beams corresponding to combined first and second optical fields having different polarizations and produce radially and azimuthally polarized beams respectively. The analyzer is located downstream of said polarization converter.

15 Claims, 11 Drawing Sheets

→ Radial polarization $A_2$   ---→ Vector sum $A_1$
·····→ Azimuthal polarization $A_3$   ⟶ Rotation direction $A_4$

(56) References Cited

OTHER PUBLICATIONS

R. Dorn et al., "Sharper Focus for a Radially Polarized Light Beam," Phys. Rev. Lett., Dec. 2, 2003, vol. 91, No. 23.

I. Nishiyama et al., "Single-shot birefringence measurement using radial polarizer fabricated by direct atomic force microscope stroking method," Meas. Sci. Technol., May 8, 2007, pp. 1673-1677, vol. 18.

Y.S. Chang et al., "Distance and velocity measurements by the use of an orthogonal Michelson interferometer," Appl. Opt., Jan. 1, 1997, pp. 258-265, vol. 36, No. 1.

G.M. Lerman et al., "Generation of a radially polarized light beam using space-variant subwavelength gratings at 1064 nm," Opt. Lett., Dec. 1, 2008, pp. 2782-2784, vol. 33, No. 23.

\* cited by examiner

INTERFEROMETER WITH A SPACE-VARIANT POLARIZATION CONVERTER TO PRODUCE RADIALLY AND AZIMUTHALLY POLARIZED BEAMS

FIELD OF THE INVENTION

This invention is generally in the field of interferometers and interferometry-based applications, particularly useful for inspection of specimens, and relates to a polarization-based interferometer.

REFERENCES

The following references are considered to be pertinent for the purpose of understanding the background of the present invention:
1. Q. Zhan and J. R. Leger, "Interferometric measurement of the geometric phase in space-variant polarization manipulations", Opt. Comm., 213, Issues 4-6, 241-245 (2002).
2. I. Nishiyama, N. Yoshida, Y. Otani and N. Umeda "Single-shot birefringence measurement using radial polarizer fabricated by direct atomic force microscope stroking method", Meas. Sci. Technol. 18, 1673-1677, (2007).
3. Y. S. Chang, P. Y. Chien and M. W. Chang "Distance and velocity measurements by the use of an orthogonal Michelson interferometer", Appl. Opt. 36, 258-264, (1997).
4. G. M. Lerman and U. Levy, "Generation of a radially polarized light beam using space-variant subwavelength gratings at 1064 nm," Opt. Lett. 33, 2782-2784 (2008).

BACKGROUND OF THE INVENTION

Interferometry-based techniques are used in various applications such as length measurement, as well as inspection of sample, e.g. biological samples. Generally, these techniques are based on the use of a change in an interference pattern of two light beams to determine of a phase shift induced in one of the beams by its interaction with a sample under inspection.

Interferometers can also be used for the measurement of a distance (or changes of a distance or a position, i.e., a displacement) with an accuracy of better than an optical wavelength; for measuring the wavelength of a laser beam, or for analyzing a beam in terms of wavelength components; for monitoring slight changes in an optical wavelength or frequency (typically using the transmission curve of a Fabry-Pérot interferometer); for measuring rotations (with a Sagnac interferometer); for measuring slight deviations of an optical to surface from perfect flatness; for measuring the linewidth of a laser; for revealing refractive index variations or induced index changes in a transparent medium; for modulating the power or phase of a laser beam; for measurements of the chromatic dispersion of optical components; as an optical filter or for the characterization of ultrashort pulses via spectral interferometry. Depending on the application, the light source used with an interferometer can be very different.

Two main configurations of interferometers are generally used, based on the principles of a Mach-Zehnder interferometer and a Michelson interferometry. Mach-Zehnder interferometer determines a relative phase shift between two collimated beams from a coherent light source propagating along different paths towards a location where they interfere with one another, which phase shift is caused by a sample or a change in length of one of the paths. Michelson interferometer is a Mach-Zehnder interferometer that has been folded back upon itself. In the Michelson interferometer, the same beam splitting optics is used to recombine the beams.

Typically, interferometry is performed with two beams having the same polarization. Polarization-based interferometers, utilizing orthogonally polarized beams have been developed for various applications, e.g. distance and velocity measurements [3]. A Mach-Zehnder interferometer operating with radial polarization was demonstrated for the measurement of the geometric phase [1], and a radial polarizer was shown to be useful for a single shot birefringence measurement [2].

General Description

There is a need in the art in improving interferometry-based technique by increasing the resolution of measurements, i.e. determining a phase difference between two interacting beams with higher accuracy. The present invention provides a novel interferometric system, which combines the concepts of spatially inhomogeneous polarization fields (other than circular, elliptical, or linear) and orthogonal polarization interferometry (using orthogonally polarized beams in the interferometry setup).

The interferometer of the present invention generates a spatially varying intensity pattern along the cross section of the beam, assisting in overcoming the limited accuracy enforced by the bit quantization of a pixel-matrix light detector such as a CCD camera. The spatially varying intensity pattern yields additional spatial and phase information improving displacement or phase-change measurements.

Generally, an interference pattern is produced by splitting a beam of light into two paths, bouncing the beams back and recombining them. The different paths may be of different lengths (for example by moving a moveable mirror) or be composed of different materials (if a sample to be analyzed is placed in one of the two arms of the interferometer) to create alternating interference fringes on a back detector. Typically, the mirror having a fixed spatial relationship with the beam splitter/combiner defines a reference arm, while the other arm accommodating a sample or having a mirror having a variable spatial relationship with the beam splitter/combiner is defined as the sampling arm.

A new interferometric system of the invention utilizes conversion of a uniform phase difference between the arms of the interferometer to a spatially varying intensity distribution. The system is based on interfering radially and azimuthally polarized beams corresponding to respectively two orthogonally polarized light components, and measuring a projection of the obtained field on an analyzer thus producing an interference pattern of two light parts each carrying information of both the reference and the sampling arms. This method provides additional spatial information that can be used to improve the smallest detectable phase change as compared with a conventional Michelson interferometer.

By interfering radially and azimuthally polarized beams, the phase difference between the interferometer's arms is manifested as spatially varying intensity distribution. This is in contrast with conventional interferometers where phase change results in a spatially uniform intensity change. This novel system provides additional spatial information that can be used for displacement and phase change measurements with improved accuracy compared with a conventional Michelson interferometer.

According to one broad aspect of the invention, there is provided an interferometer comprising:
an optical assembly, configured and operable to produce first and second spatially separated optical fields of incident coherent radiation of substantially the same intensity and different polarizations and to define first and second spatially separated optical paths for propagation of said first and second optical fields thereby allowing interaction between the first optical field and an element affecting a phase thereof in said first optical path, said optical assembly comprising a beam splitter/combiner for combining said first and second optical paths into a combined path at a location downstream of said element with respect to the optical fields' propagation through the interferometer;

a space-variant polarization converter accommodated in said combined path and being configured and operable to simultaneously apply space-variant polarization conversion to two beams corresponding to combined first and second optical fields having different polarizations and produce radially and azimuthally polarized beams respectively, an analyzer downstream of said polarization converter, interaction of the radially and azimuthally polarized beams at the analyzer creating interference fringes corresponding to a spatially varying intensity pattern distribution indicative of a two-dimensional varying phase difference between the first and second optical fields propagating along the first and second optical paths indicative of interaction of said first optical field with said element. Preferably, the first and second optical fields have orthogonal polarizations.

The analyzer comprises a linear polarizer to thereby allow the interaction of the radially and azimuthally polarized beams corresponding to said orthogonally polarized optical fields.

The analyzer might be rotatable in plane substantially perpendicular to an axis of light propagation from the polarization converter to the analyzer, thereby allowing appropriate orientation of its plane of polarization with respect to said orthogonal polarizations of the first and second optical fields.

Preferably, the same beam splitter/combiner is used to split input light into first and second light components corresponding to said first and second optical fields. The beam splitter/combiner is preferably a polarization beam splitter/combiner.

The input light may generally be unpolarized. In this case, the optical assembly may include at least one polarizer unit comprising two polarizer elements, one of the polarizer elements being configured and operable to create a linear polarized beam and the other polarizer element being configured and operable to rotate polarization of the linear polarized beam an angle of 45° with respect to the linear polarization axis.

Preferably, the input light is linearly polarized.

The optical assembly may include a polarizer element comprising a half wave plate oriented with its optical axis at 22.5° with respect to the polarization direction of the linear polarized light.

In some embodiments, of the invention, the element affecting a phase of radiation passing therethrough is a sample to be inspected. The interferometer of the invention provides for fast and effective (high resolution) depth profiling of the sample.

Typically, the reference optical path comprises a reflective surface (preferably stationary mounted at a predetermined location in said reference optical path). Thus, the first and second spatially separated optical fields propagating along the first and second optical paths interact with respectively said element (e.g. sample to be inspected) and said reflective surface, and are returned to propagate back along the first and second paths orthogonally oriented with respect to one another.

The element in the sampling path may sequentially affect a phase of the first optical field at successive planes of interaction with said first optical field at successive locations along the first optical path.

Conventionally, to measure displacements using an interferometer, a translation of a mirror is used to modify the phase difference between the two arms of the interferometer, causing an intensity change on the detector (typically a digitized detector with a finite number of bits). Neglecting all error sources except quantization error, the detection resolution of phase changes is limited by the least significant bit of the detector.

In contrast, with the interferometer of the present invention, the intensity distribution on the light detector is not uniform. Instead, it is spatially varying across all pixels of the camera, and phase changes below the least significant bit of a detector can be recorded. In calculations, the minimum detectable phase change of the interferometer of the present invention (using an 8 bit, 1024×1024 pixel camera) was always found to be three to four orders of magnitude smaller than for the Michelson interferometer, meaning the interferometer of the present invention is capable of measuring a phase difference between two interacting beams with higher accuracy as well as much smaller displacements.

The interferometer of the present invention also improves over the Michelson approach for retrieving the phase profile of a test object/sample placed in one arm of the interferometer. A side-by-side comparison of the interferometer of the present invention with a Michelson interferometer has been performed with a test object/sample consisting of a lens with a circular symmetric quadratic phase profile. Two very different interferograms were obtained. Even though both have the same number of fringes, the interferogram using the interferometer of the present invention shows an intensity minimum every $\pi$ phase shift along the radial coordinate, while the Michelson interferogram shows minimum intensity every $2\pi$ along the radial coordinate. This difference means that the interferometer of the present invention is better suited to measure the phase profile of the test object/sample, since detection of a small intensity change in a shot-noise-limited system is more accurate in the vicinity of a minimum (there are twice as many in the interferogram of the interferometer of the present invention) due to the lower noise level.

According to another aspect of the present invention, there is also provided a method for identifying interaction of optical fields. The method comprises providing incident radiation in the form of a first and a second spatially separated optical fields of incident coherent radiation of substantially the same intensity and different polarizations; directing the first and second optical fields towards first and a second optical paths respectively; interacting between the first optical field and an element affecting a phase of radiation passing therethrough in the first optical path; combining the first and second optical paths into a combined path at a location downstream of the element with respect to the optical fields' propagation; converting simultaneously two beams corresponding to combined first and second optical fields having different polarizations into radially and azimuthally polarized beams respectively; and interfering between the radially and azimuthally polarized beams to create interference fringes corresponding to a spatially varying intensity pattern distribution indicative of a two-dimensional varying phase difference between the first and second optical fields propagating along the first and second optical paths indicative of interaction of the first optical field with the element, enabling to identify interaction of the one of the optical fields with the element.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 3A and 3B show separate intensity distributions as obtained from paths 1 and 2 respectively of the interferometer;

FIGS. 3C and 3D show interference pattern obtained by light components coming from the two arms with 0 and π phase differences between them, respectively;

FIG. 10A represents the noise amplitudes of 1 least significant bit (LSB); FIG. 10B represents the noise amplitudes of 0.1 LSB; the accurate phase change value is shown as well for reference; and;

DETAILED DESCRIPTION OF EMBODIMENTS

Figure 1:
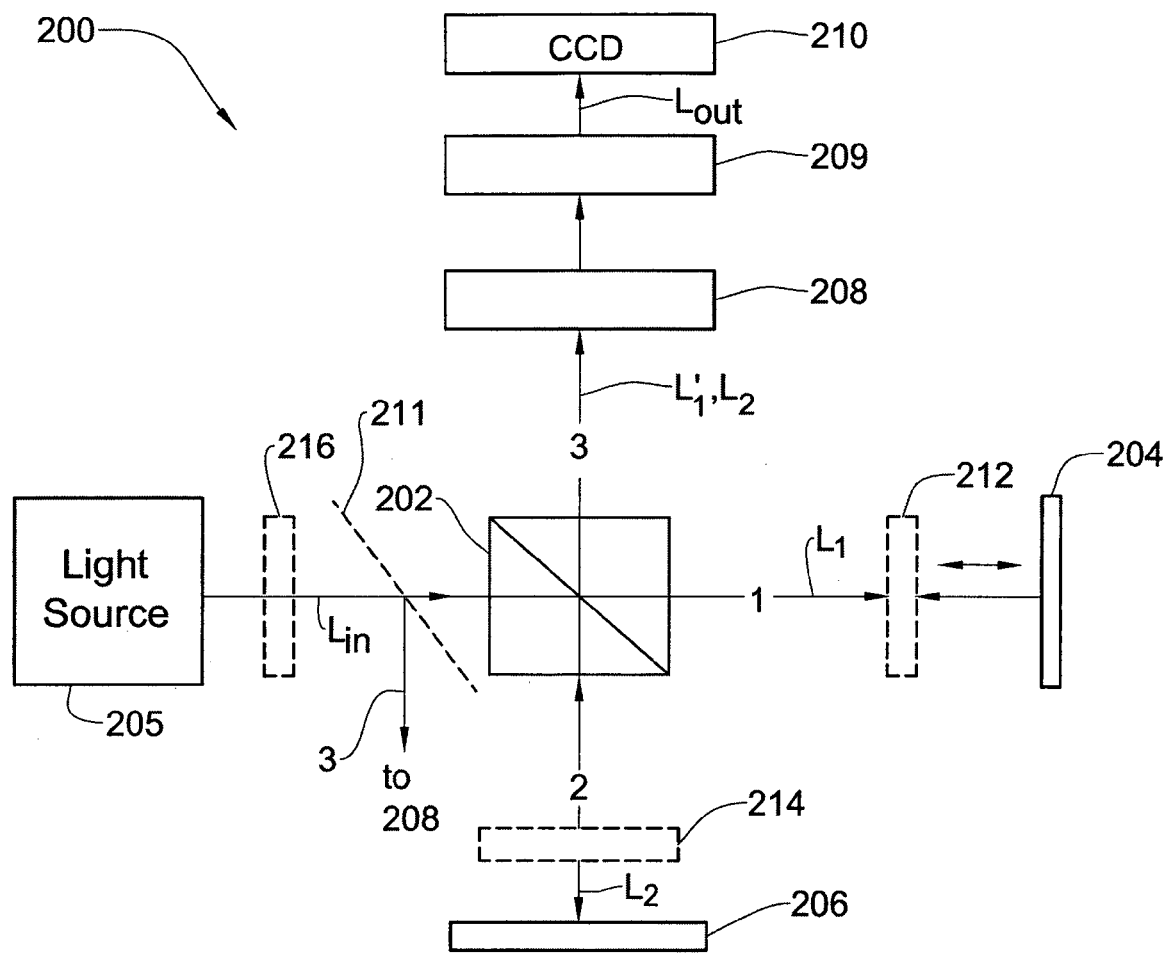
FIG. 1 is a schematic illustration of an example of the interferometer of the present invention.

Reference is made to FIG. 1 schematically illustrating an interferometric setup, generally designated 200, representing an example of the present invention. Depending on the application in which the interferometer 200 is intended to be used, the interferometer may be associated with a sample to be inspected or with a mirror movable along an axis of light incidence thereon. It should be understood that such a sample/movable mirror actually constitutes an element, generally designated 204, affecting a phase of light interacting therewith. It should also be understood that interaction of a light beam with a movable mirror actually corresponds to light passage through a sample and thus the light interaction with successive planes of the sample along an axis of light propagation. The displacement/translation of the mirror (similarly to the interaction with different planes of a sample) generates a phase shift in said light beam. The interferometer 200 includes an optical assembly configured and operable for producing two spatially separated optical fields $L_1$ and $L_2$ (light components) of incident coherent radiation of substantially the same intensity and orthogonal polarizations and directing these two light components $L_1$ and $L_2$ along two paths 1 and 2 respectively. The sample (phase effecting element) 204 is located in one of these two paths—in path 1 in the present example.

It should be noted that such two spatially separated light components of substantially the same intensity and different polarizations can generally be produced by separate, identical light emitters. Practically, however, these light components are generated by using a common light emitter (e.g. laser) 205 and a beam splitter/combiner 216. Generally, a light emitter can produce unpolarized light, in which case a polarizer element is placed at the output of the light emitter and the so-obtained linearly polarized light is incident on a polarization beam splitter/combiner. Alternatively, a light emitter is of the kind producing linearly polarized light, in which case this light is directly incident onto a polarization beam splitter/combiner. Preferably, light $L_{in}$ input to the interferometer 200 is linearly polarized light and a polarization beam splitter/combiner 216 is placed in an optical path of the input light $L_{in}$.

Thus, the polarization beam splitter/combiner 216 splits input linearly polarized light $L_{in}$ into light components $L_1$ and $L_2$ of substantially equal intensities and orthogonal polarizations, and directs them along the optical paths 1 and 2, and the same beam splitter/combiner combines light components propagating back along these two optical paths, i.e. combines these two paths downstream of the sample 204 (with respect to light propagation through the interferometer) into a combined path 3. The light propagation scheme through the interferometer 200 will be described more specifically further below.

Further provided in the interferometer system 200 is a space-variant polarization converter 208 accommodated in the combined path 3. The converter 208 is configured and operable to simultaneously apply space-variant polarization conversion to two beams with linear orthogonal polarizations in light incident thereon and produce radially and azimuthally polarized beams respectively.

An analyzer 209 is located at the output of the converter 208. The analyzer 209 is a linear polarizer, and as will be described more specifically further below, serves as an interference surface on which interference fringes of radially and azimuthally polarized interacting beams can be detected as a spatially varying intensity pattern distribution. The latter is indicative of a phase difference between light components in the two paths 1 and 2 of the interferometer indicative of an effect of interaction of one of the light components with the sample 204. The analyzer 209 might be rotatable in a plane perpendicular to the light path 3 and therefore in a plane perpendicular to an axis of light propagation from the polarization converter.

A mirror 206 is located in the optical path 2 and constitutes a reflective surface which reflects light component $L_2$ and directs it to propagate back along the path 2 towards the beam splitter/combiner 202. The light component $L_2$ presents a "reference light component" propagating along the "reference path" 2. The location of the mirror 206 with respect to the beam splitter/combiner 202 is fixed.

As further shown in the figure, the interferometer 200 may also include polarization rotators 212 and 214, the provision of which is optional and is associated with a selection of the combined path 3 to be spatially separated from the input light path $L_{in}$, as will be described more specifically further below. It should be understood that if the combined output path 3 is coinciding with the input light path, than the need for the polarization rotators is eliminated, and alternatively a semi-transparent mirror 211 (shown in the figure in dashed lines) is used to deflect "combined" light output of the beam splitter/combiner 202 towards the polarization converter 208.

The polarization converter 208 may be of any known suitable configuration. Generally, a polarization converter 208 converts an input linearly polarized light into a beam having radial or azimuthal polarization distribution. The present invention utilizes simultaneous polarization conversion of both orthogonally polarized inputs into respectively radial and azimuthal polarization distributions. The polarization converter may include an array of wave plates providing an approximation to radially and azimuthally polarized beam. Such converter may be based on that described in R. Dorn, S. Quabis, and G. Leuchs, "Sharper Focus for a Radially Polarized Light Beam," Phys. Rev. Lett. 91, 233901 (2003). In another example, the polarization converter may include liquid crystal media converting the polarization of a beam to a radial state and azimuthal state. Due to a special alignment of the liquid crystal molecules, the polarization converter rotates locally the orientation of the linearly polarized beam. In yet another example, the polarization converter may include a birefringent material focusing the radial and azimuthal polarizations of a laser focused along the optic axis of the birefringent material, at different planes. A spatial filter can then be used to select the polarization of interest. Preferably, the polarization converter utilizes space-variant sub-wavelength gratings generating $\pi$ phase retardation between ordinary- and extraordinary-polarization components. Such polarization converter is described in [4] incorporated herein by reference with respect to this specific example.

Thus, the interferometer 200 operates in the following manner. The polarization beam splitter/combiner 202 splits the input linearly polarized radiation $L_{in}$ into two spatially separated parts/light components $L_1$ and $L_2$ of substantially equal intensities and orthogonal polarizations, and directs them along optical paths 1 and 2 towards the sample (represented in the present example by mirror 204 movable along the path 1) and stationary mounted mirror 206 respectively. As indicated above, movement of the mirror 204 along the optical path 1 corresponds to the light component $L_1$ propagation through a sample successively inducing phase shifts to this light component as compared to that of the other light component $L_2$. Accordingly, the light components $L_1$ and $L_2$ returned from respectively the sample (mirror 204) and mirror 206 are characterized by a phase difference indicative of the effect of light L1 interaction with element 204. The phase difference would change continuously if the light component $L_1$ sequentially interacts with successive planes in the sample (the mirror 204 slides along the optical path 1). This phase difference is to be detected and analyzed to obtain information about said element 204, e.g. for the depth profiling of light response of the sample.

As indicated above, the interferometer of the present invention may be used with an unpolarized input radiation or a linearly polarized radiation in an arbitrary plane, such as a laser beam linearly polarized along the x axis. A polarization rotator 216, such as a wave plate, may be used to adjust the plane of polarization of the input light to a suitable orientation with respect to the polarization beam splitter/combiner. In this specific and non-limiting example, a half wave plate 216 at 22.5 degrees is provided in the optical path of input light $L_{in}$ to adjust the plane of polarization, thus light incident on the polarization beam splitter/combiner 202 has 45-degrees polarization.

Downstream of the beam splitter/combiner 202, the light components L1 and L2 pass through polarization rotators 212 and 214 respectively. As indicated above, the provision of these polarization rotators is aimed at adjusting polarizations of light components propagating back through paths 1 and 2 so as to be combined and directed along the output light path 3 perpendicular to the input light path.

Thus, in this specific and non-limiting example, the light components L1 and L2 pass through the quarter wave plates (QWPs) 212 and 214 oriented at 45° with respect to the polarization axis, thus rotating the polarization of light components in the same or opposite directions. For example, if light components L1 and L2 emerge from the beam splitter/combiner 202 with x- and y-axis polarizations respectively (or vice versa), their interactions with the QWPs 212 and 214 result in circular polarization of each of the light components. Circular polarized light component L2 is reflected by mirror 206, and while propagating back along the path 2 towards the beam splitter/combiner 202 passes again through QWP 214 which rotates the polarization of this light beam from circular to y-axis one. Similarly, circular polarized light component L1 interacts with the phase affecting element (sample) 204 and returned light L1' while propagating back along the path 1 towards the beam splitter/combiner 202 passes through QWP 212 which rotates the polarization of this light beam from circular to x-axis polarization. Thus, two orthogonally polarized light components L1' and L2, being respectively sampling and reference light components, are "combined" at the beam splitter/combiner 202 and reflected therefrom to the combined path 3 (spatially separated from the input light path).

As a result, two spatially overlapping beams $L_1'$ and $L_2$ that are linearly and orthogonally polarized with respect to each other are obtained propagating together to the polarization converter 208. The latter simultaneously converts these two orthogonally linearly polarized beams into corresponding radially and azimuthally polarized vector beams, where the radially polarized beam carries information about phases of either one of light components L1' and L2 and the azimuthally polarized beam carries information about the complimentary light component. Thus, these radially and azimuthally polarized vector beams actually correspond to a two-dimensional phase difference between the light components undergoing the polarization conversion. The so-obtained spatially varying polarized vector beams are incident onto the analyzer (linear polarizer) 209, and linearly polarized output light $L_{out}$ filtered (passed) by the analyzer 209 from the two input radially and azimuthally polarized vector presents an interference pattern indicative of interaction of light components carrying information about phases of both the light component L1' and the light component L2. This interference pattern (i.e. the plane of the analyzer) may be imaged on a pixel-matrix light detector 210 (e.g. a CCD camera). It should be understood that an electric field of light before the analyzer 209 is the vector sum of the two fields, each formed by light from the two interferometer's paths 1 and 2. As the light component L1 sequentially interacts with phase affecting element at different locations (e.g. while passing through the sample), the phase difference between the light components L1' and L2 is being changed, and accordingly the corresponding phase difference between the radial and azimuthal polarizations is changed.

Therefore, the imaged intensity distribution (interference pattern) has dark and bright areas; depending on the local projection of the polarization field on the analyzer 209. Clearly, a change in the phase difference between the light components in the two arms of the interferometer (due to interaction with different planes through the sample, or movement of mirror 204) modifies the vector sum of the two beams, resulting in a modulation of the spatially varying intensity distribution at the analyzer.

For the sake of comparison, the normalized intensity distribution of a conventional Michelson interferometer is given by:

$$I_1(\varphi) = \frac{1}{2}(1 + \cos\varphi) \quad (1)$$

where $\phi$ is the phase difference between the light components in the interferometer's arms.

The normalized intensity distribution of the interferometer of the present invention is given by:

$$I_2(\phi,\theta,\phi_p) \propto |T_p \cdot (V_r e^{i\phi} + V_a)|^2 \quad (2)$$

where $$V_r = \begin{pmatrix} \cos\theta \\ \sin\theta \end{pmatrix} \text{ and } V_a = \begin{pmatrix} -\sin\theta \\ \cos\theta \end{pmatrix}$$

are the Jones vectors of the radial and azimuthal polarizations, respectively, $$T_p = \begin{pmatrix} \cos^2\varphi_p & \sin\varphi_p\cos\varphi_p \\ \sin\varphi_p\cos\varphi_p & \sin^2\varphi_p \end{pmatrix}$$

is the Jones matrix of a linear polarizer/analyzer, $\phi$ is the phase difference between the interferometer's arms, $\theta$ is the azimuthal angle of a specific coordinate at the beams cross section and $\phi_p$ is the angle of the optical axis of the polarizer/analyzer.

Using these expressions, the following expression is obtained:

$$I_2(\varphi, \theta, \varphi_p) = \frac{1}{2}(1 + \sin(2(\varphi_p - \theta)) \cdot \cos\varphi) \quad (3)$$

By setting $\phi_p = \pi/4$, this expression becomes $$I_2(\varphi, \theta) = \frac{1}{2}(1 + \cos 2\theta \cdot \cos\varphi) \quad (4)$$

Figure 2D:
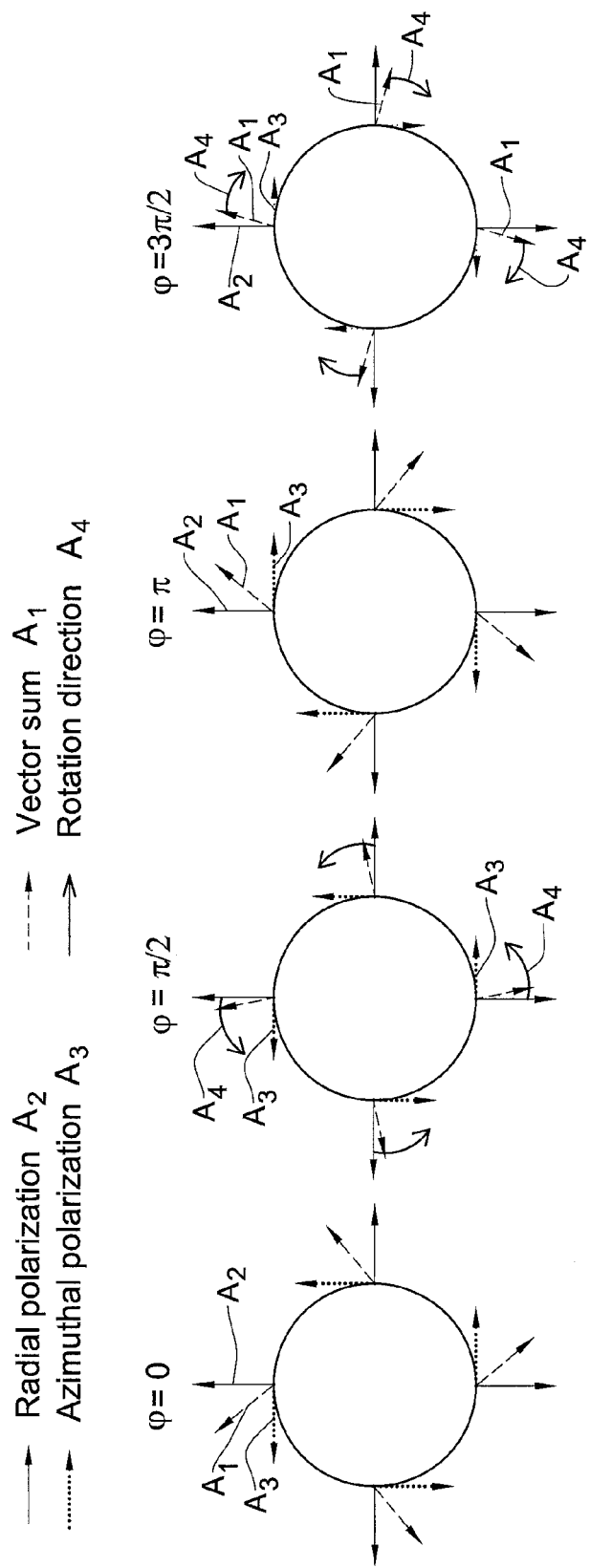
FIGS. 2A to 2D show schematic representation of the polarization fields before an analyzer for a few different values of phase ϕ respectively.
Figure 2D:
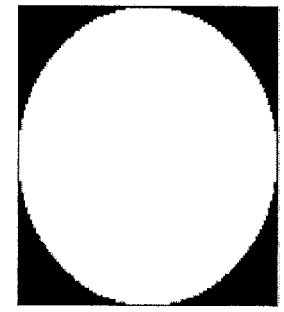
Figure 2C:
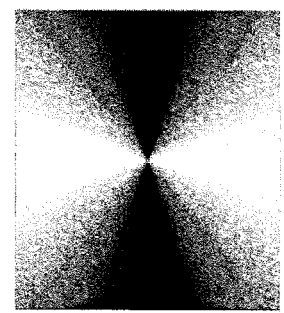
Figure 2B:
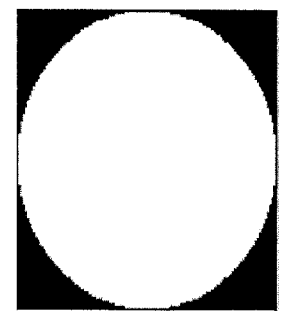
Figure 2A:
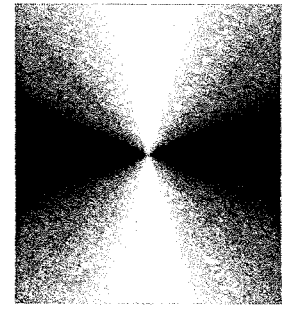

Reference is now made to FIGS. 2A-2D schematically representing the polarization direction of the superpositioned beams before the analyzer for several values of phase difference between the interferometer's arms (upper panel). The polarization fields before the analyzer are represented for 4 values of $\phi$ respectively being equal to 0 (FIG. 2A), $\pi/2$ (FIG. 2B), $\pi$ (FIG. 2C) and $3\pi/2$ (FIG. 2D). The vector sum A1 of the radial A2 and azimuthal A3 components is shown for each case. The rotation direction A4 is shown as well when the field has a circular polarization.

For each of these cases, the simulated intensity distribution after the analyzer, as expected to be captured by the CCD camera, is shown (lower panel). White color represents high intensity.

It can be seen that changing the phase difference between the light components in the two arms of interferometer (i.e. a change in the optical paths along these arms) by $\pi$ results in a 90° rotation of the intensity distribution. More importantly, the intensity difference between maximum and minimum intensity values is also changing with the phase difference. This intensity difference was tracked by defining the contrast of the interferogram as $$C = \frac{\max(I(\theta)) - \min(I(\theta))}{\max(I(\theta)) + \min(I(\theta))},$$

where $I(\theta)$ is the intensity as a function of $\theta$, calculated from the interferogram's data.

From the analytical expression (Eq. 4) and from the illustration in FIGS. 2A-2D, one can notice that the contrast is changing from 1 to 0 and back to 1 upon varying the phase difference by $\pi$. At the same time, the orientation of the pattern is rotated by $\pi/2$, giving another valuable information for determining the phase difference, and accordingly an effect of light interaction with the sample.

Reference is made to FIGS. 3A-3D illustrating representative examples of the intensity distribution after passing through the analyzer. For each phase value, the intensity distribution behind the analyzer was captured by a CCD.

In this experiment, in order to measure phase differences using the interferometer configuration of FIG. 1, an illumination source including an Nd:YAG laser operating at 1064 nm wavelength was used.

The phase difference between the interferometer's paths 1 and 2 was altered in small increments by inserting a ~0.24 mm thick glass plate into one of the interferometer's arms and rotating it in small steps of 0.15 degrees which is equivalent to an average phase change of 0.35 radians.

Figure 3B:
FIGS. 3A-3D show representative intensity distribution after passing through the analyzer: in particular
Figure 3D:
Figure 3A:
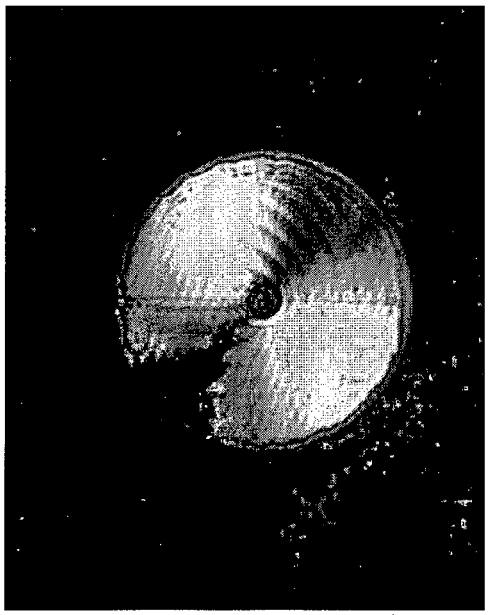
Figure 3C:
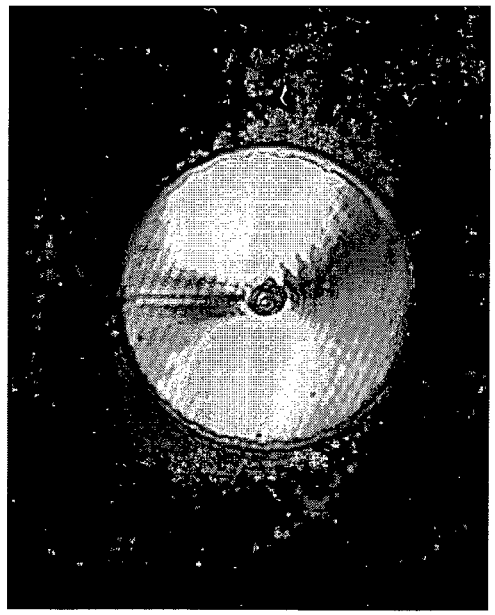

FIGS. 3A-3B show the intensity distributions as obtained separately from paths 1 and 2 of the interferometer respectively. The interference patterns for a phase difference of 0 and $\pi$ between the two interferometer's arms are shown in FIGS. 3C and 3D, respectively, with the polarizer oriented at $\pi/4$ with respect to the x axis.

Figure 4A:
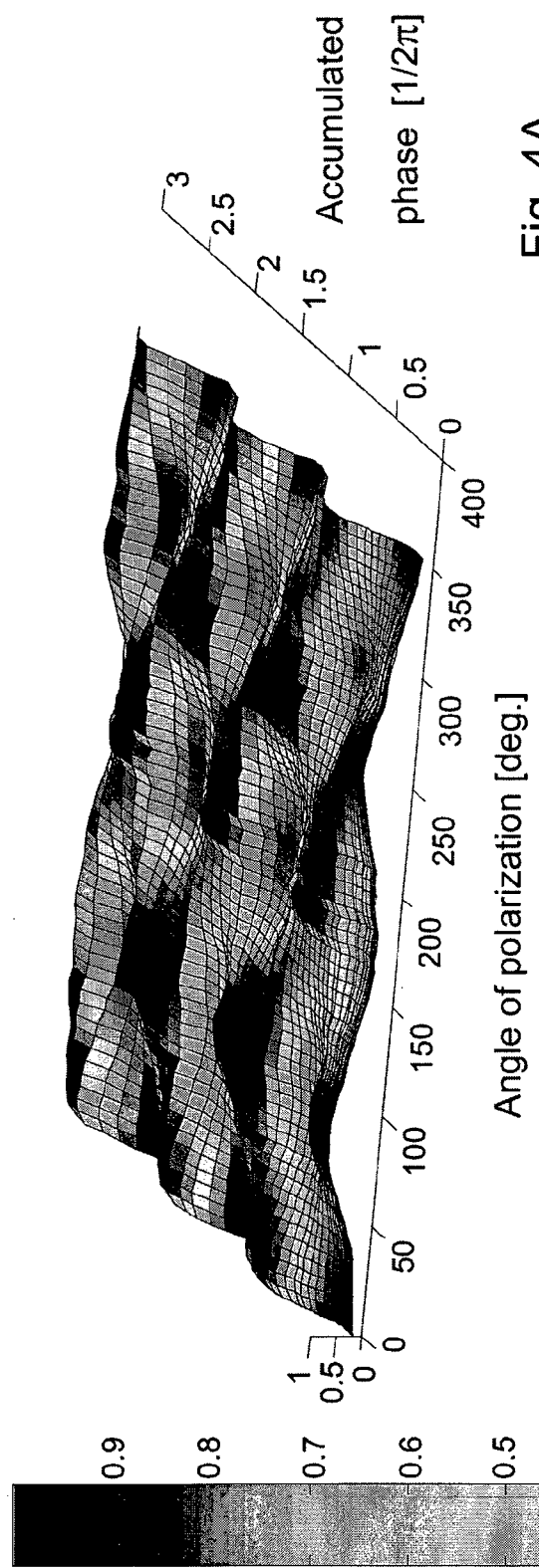
FIGS. 4A and 4B show the intensity as a function of the azimuthal angle and the phase difference between the light fields of the two arms of the interferometer, for respectively the experimental results and theoretical data expressed in Eq. (4)
Figure 4B:
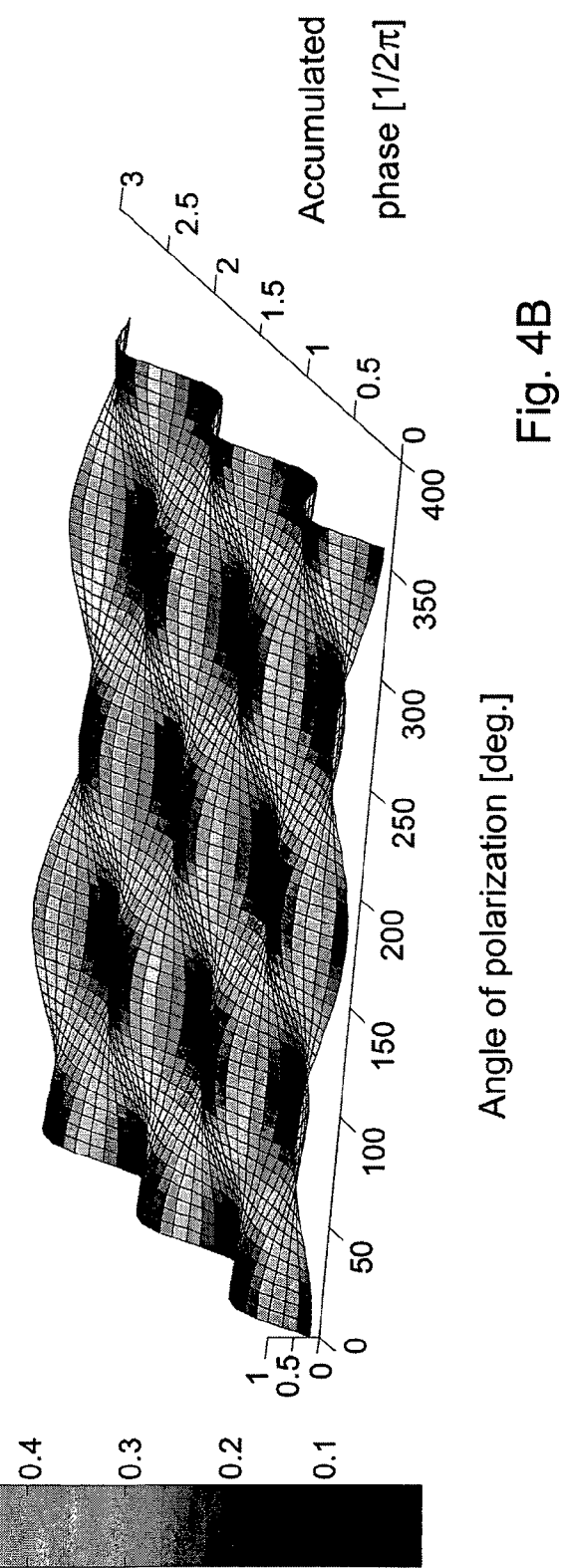

From each of the interference patterns, corresponding to different phase differences between the interferometer's arms, the intensity was calculated as a function of the azimuthal angle $\theta$, by integrating the intensity along the radial coordinate for each value of $\theta$. In this connection, reference is made to FIGS. 4A and 4B representing the calculated intensity as a function of the azimuthal angle $\theta$ and the phase difference $\phi$ between the interferometer's arms. The experimental results (FIG. 4A) were calculated from each interferogram by integration along the radial coordinate. The theoretical intensity distribution as expressed in Eq. (4) is shown as well for comparison (FIG. 4B). The accumulated phase is measured relative to an arbitrary reference point.

As can be seen, the intensity maxima are rotated by $\pi/2$ in azimuthal angle $\theta$ upon changing the phase difference between the interferometer's arms by $\pi$. These results clearly show the vectorial nature of the interferometer and the periodicity of $\pi$ in the contrast of the interferogram. From each interferogram captured at a different phase value, the contrast was calculated and plotted against the phase difference between the interferometer's arms.

Figure 5:
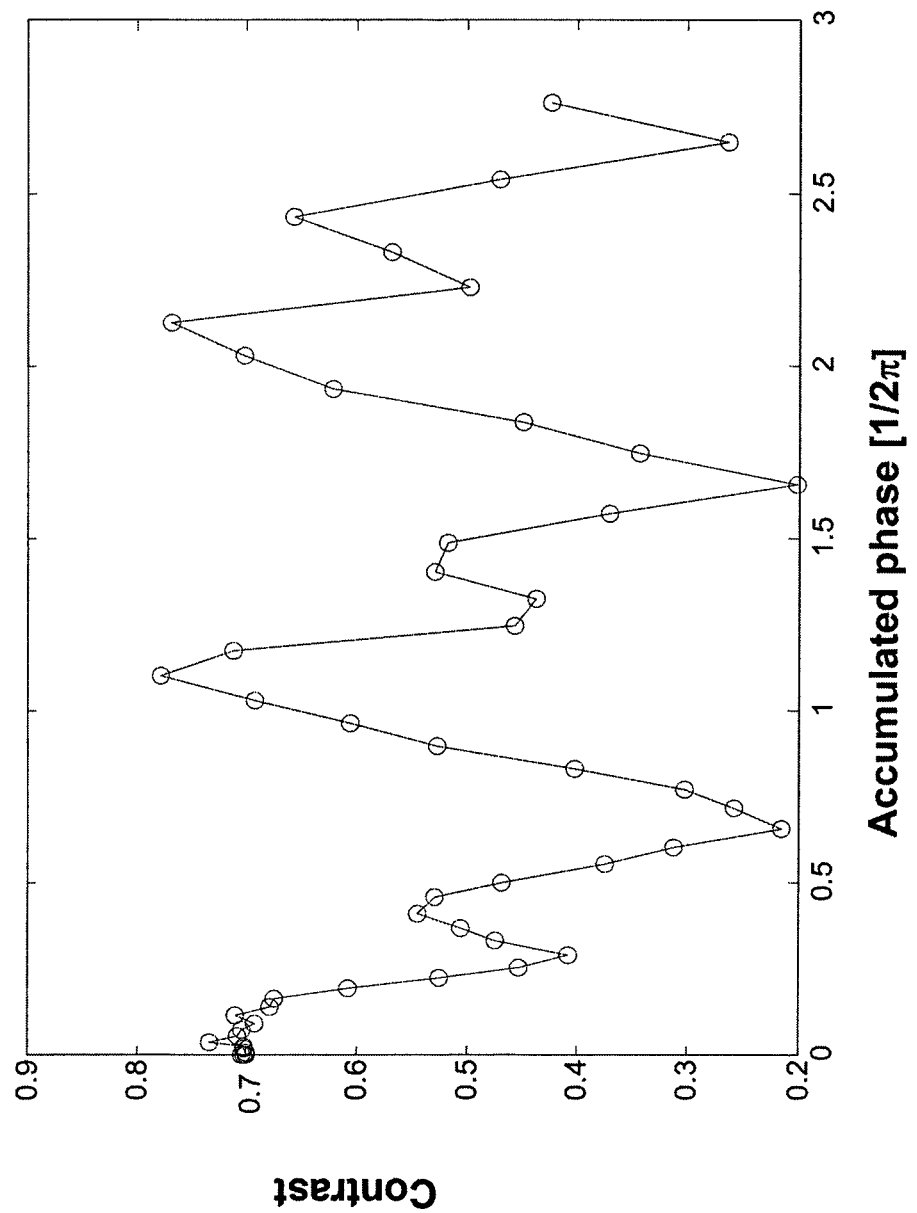
FIG. 5 represents the contrast of interferograms as a function of the accumulated phase difference.

The results are shown in FIG. 5 representing contrast of interferograms as a function of the accumulated phase difference. The periodicity of π in phase difference is clearly observed, as expected. Unfortunately, the obtained contrast is limited due to imperfections in the radial polarization conversion element and to a small translation of one beam with respect to the other due to the rotation of the glass plate.

Figure 6:
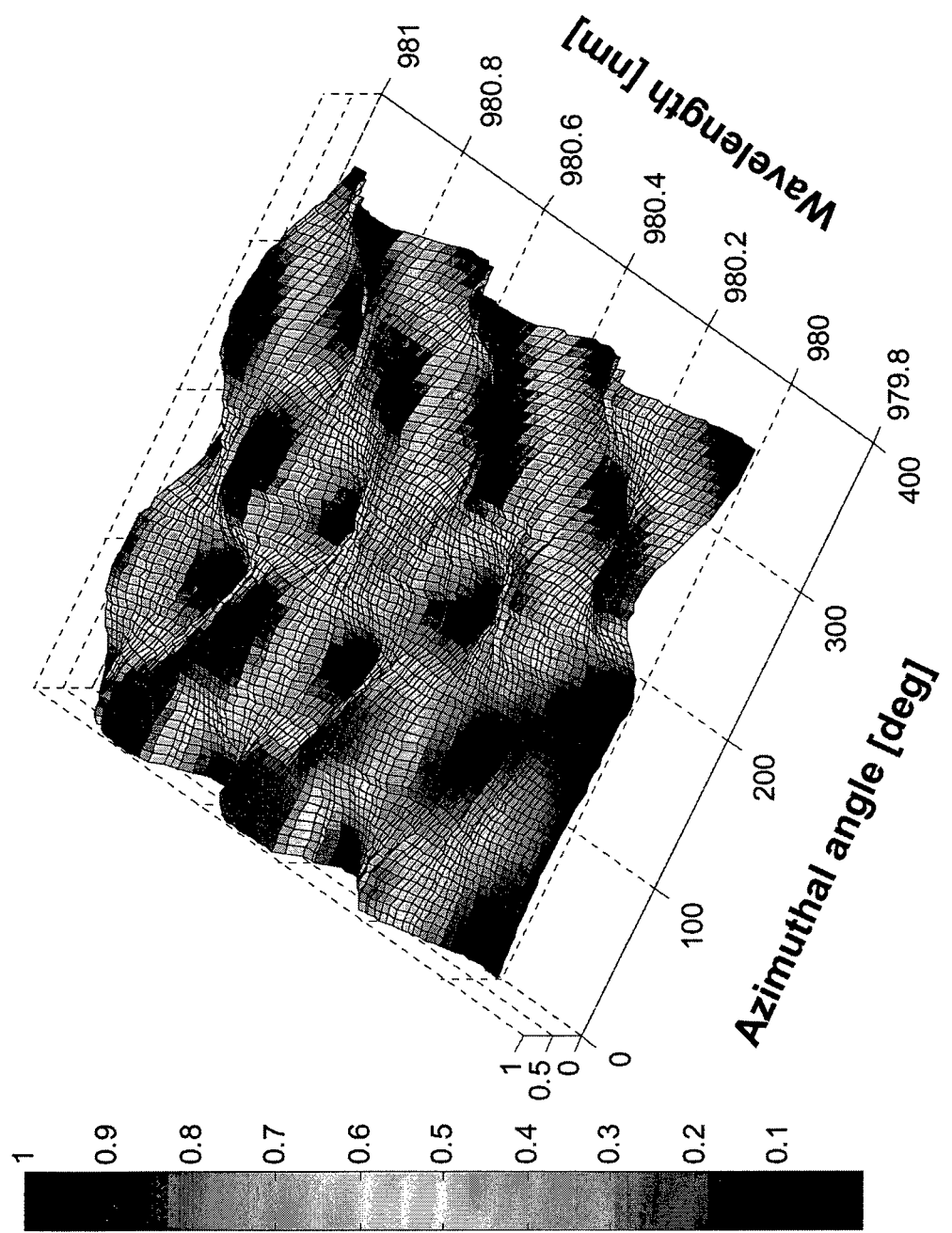
FIG. 6 represents the intensity as a function of the azimuthal angle and the illumination wavelength.

Another form of using the interferometer of the present invention is by keeping the mirrors constant and using a tunable wavelength illumination source to find the difference in path lengths between the two arms. The relative phase between the interferometer's arms is changing with the wavelength of input light, and the recorded interferogram varies accordingly, allowing for finding the relative path difference between the two arms. A tunable laser source (velocity, new focus) with a wavelength range of 960-995 nm was used, and the interferograms were recorded while sweeping the illumination wavelength. In this connection, reference is made to FIG. 6 showing the obtained intensity as a function of both the polarization angle θ (azimuthal angle) and the illumination wavelength, in the range of 980-981 nm, with resolution of 0.01 nm.

Figure 7:
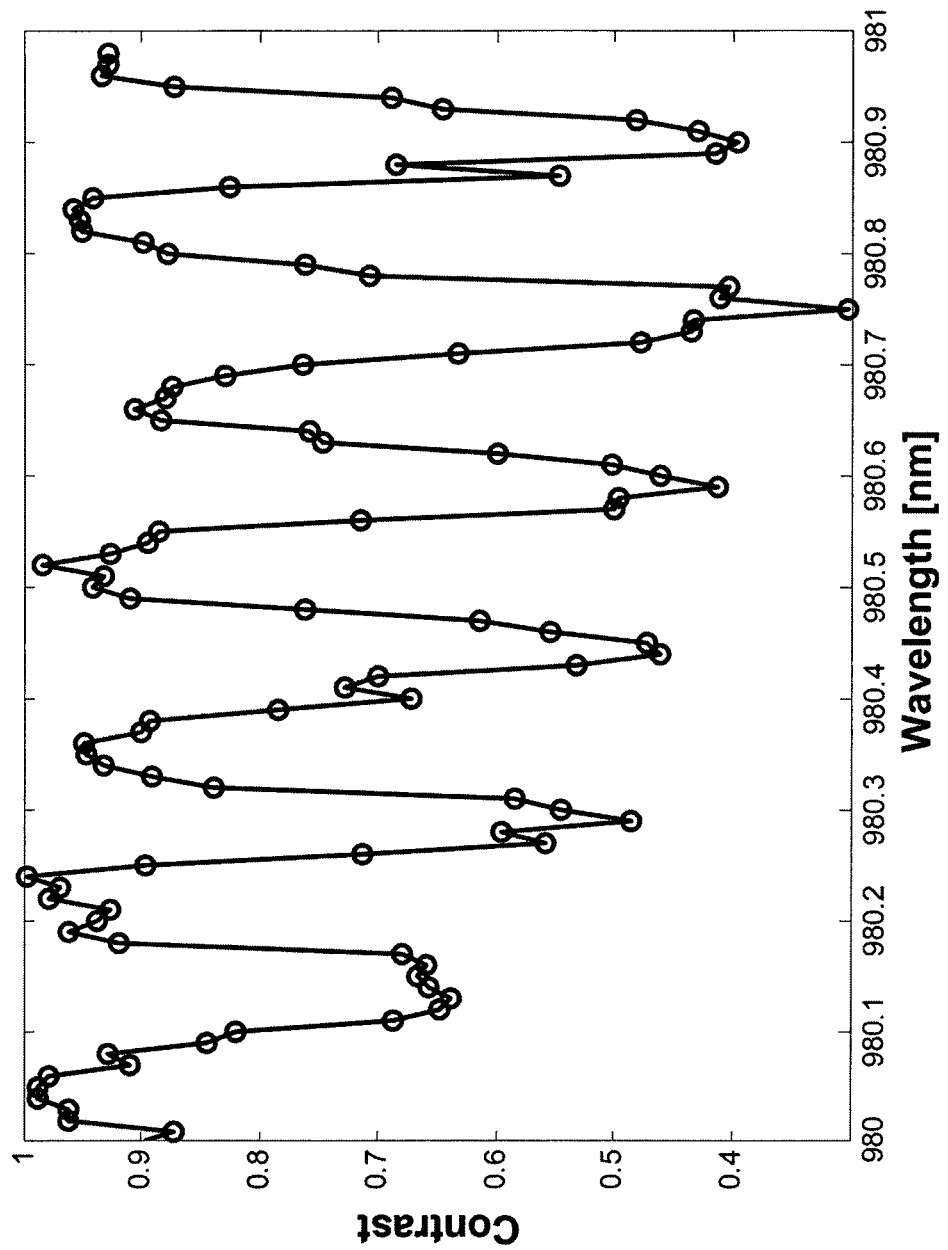
FIG. 7 represents the contrast of the interferograms as a function of the illumination wavelength.

As previously described, maxima rotation of π/2 in the azimuthal angle θ occurs as the variation in illumination wavelength corresponds to a π phase change between the interferometer's arms. Similarly to FIG. 5, the contrast is expected to vary as the wavelength is swept, because of the variation in phase difference between the two arms. This effect is shown in FIG. 7 representing contrast of the interferograms as a function of the illumination wavelength. The contrast has a period of π, where each maximum in the contrast plot has an intensity distribution that is 90° rotated with respect to the adjacent maxima.

The contrast maxima are obtained when the phase difference between the two arms is an integer multiplication of π according to $$\frac{2 \cdot \Delta L}{c} \omega = m\pi,$$

where $\Delta L$ is the path difference between the interferometer's arms, c is the speed of light, ω is the angular frequency of the illumination light and m is an integer.

Figure 8:
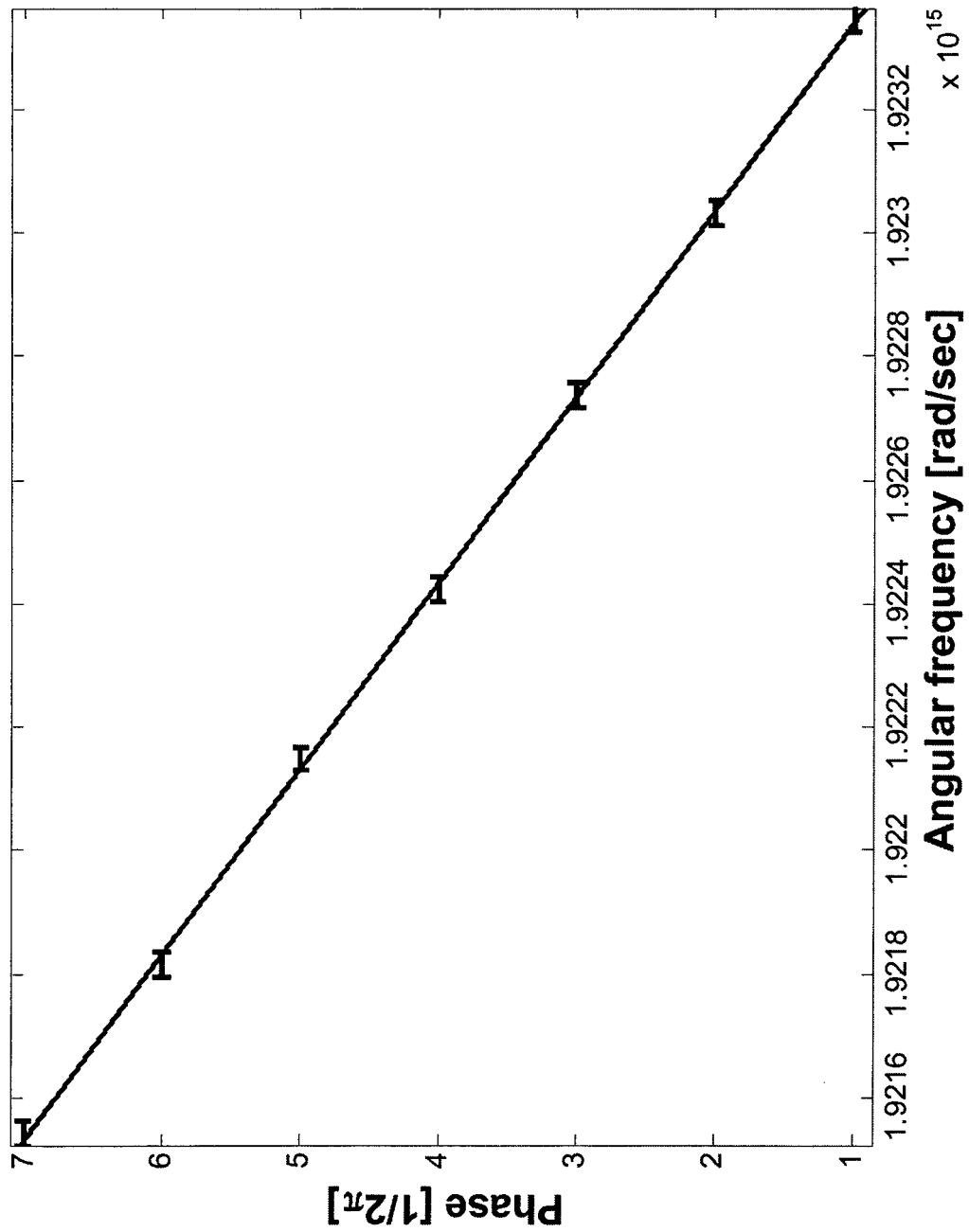
FIG. 8 represents the phase difference (relative to a reference value) as a function of the angular frequency of all the maximum points shown in FIG. 7; a linear fit is shown as well.

A plot of the phase of the maxima as a function of the angular frequency of the illumination light is shown in FIG. 8 representing a phase difference (relative to a reference value) as a function of the angular frequency of all the maximum points shown in FIG. 7. A linear fit is shown as well. From the slope of this linear curve, $\Delta L$ can be calculated, and by using the above results $\Delta L$ was found to be $\Delta L=1.56\pm0.03$ mm. The accuracy of this measurement can be improved by improving the quality of the radial polarization converter (originally optimized for 1.064 micron wavelength).

In displacement measuring interferometry, the displacement of a mirror modifies a phase difference between the interferometer's arms resulting in an intensity change of an interference pattern on a light detector. In practice, a digitized detector with a finite number of bits is typically used. Therefore, neglecting all error sources except for the quantization error, the detection resolution of phase changes is limited by the least significant bit (LSB). For example, by taking the derivative of Eq. (1) and assuming that $\phi=\pi/4$, the minimum detectable phase change is given by $\Delta\phi_{min}=2\sqrt{2}\Delta I_{min}$, where $\Delta I_{min}$ is the minimal detectable intensity change. Assuming a 10 bit detector, $\Delta\phi_{min}\approx3\cdot10^{-3}$ rad.

In contrast, for a given phase difference φ the intensity distribution on the camera of the interferometer of the present invention, is not uniform. Instead it is spatially varying according to Eq. (4) with a range of 2 cos φ across all the pixels of the camera. Therefore, it is very likely to find pixels with intensity that is very close to the next gray level, so that even a slight phase change, much below the LSB is expected to modify the intensity reading in those pixels.

Figure 9:
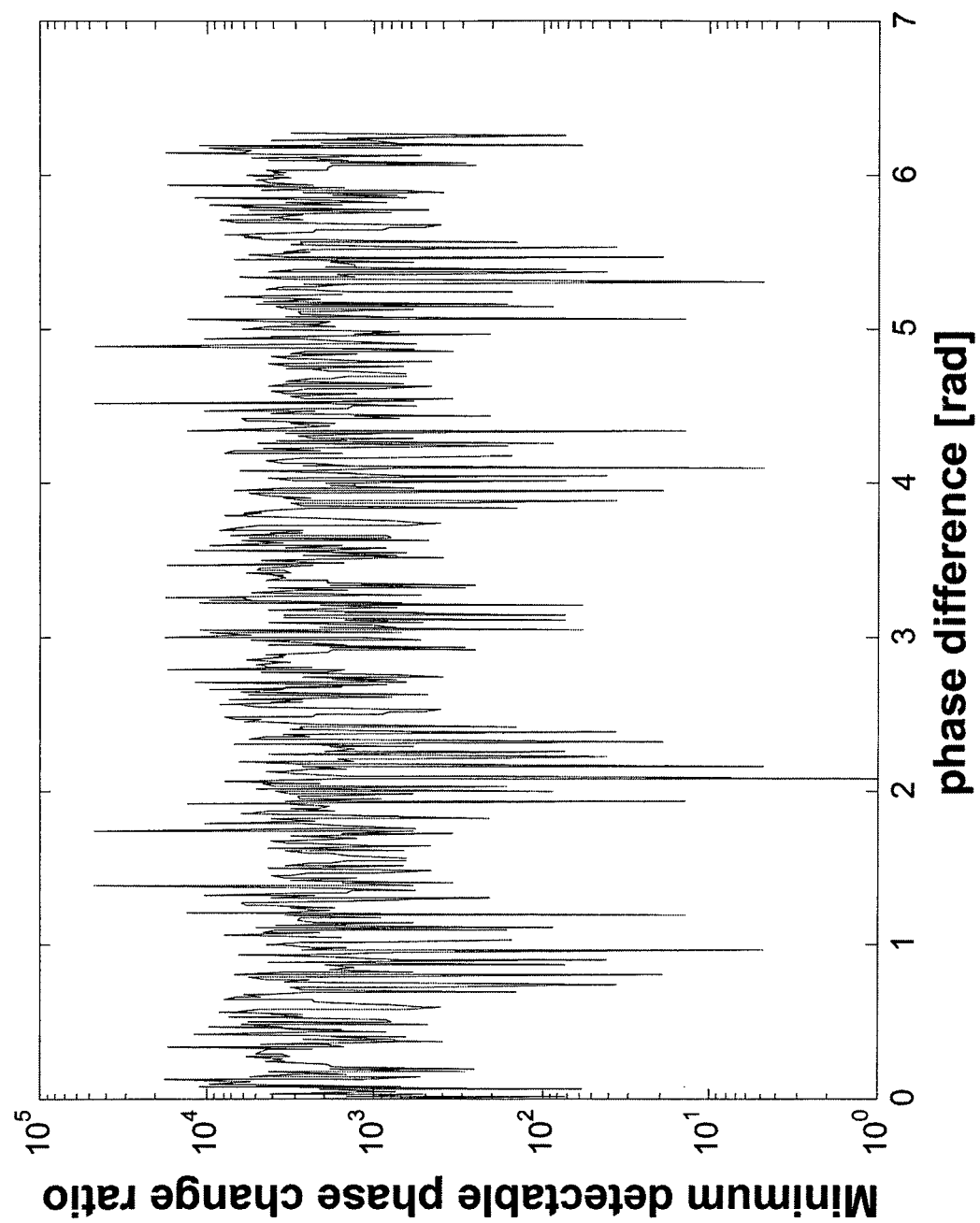
FIG. 9 represents the ratio of the minimal detectable phase change in a CMI and the interferometer of the present invention as a function of the phase difference between the interferometer's arms.

Using Eqs. (1) and (4) the minimum detectable phase change was calculated for the interferometer of the present invention and for a conventional Michelson interferometer as a function of the phase difference φ between the arms. A change in phase difference is assumed to be detectable if the intensity measured by the camera is modified in at least 100 of its pixels. The minimum detectable phase change of the interferometer of the present invention was found to be always smaller than that of the conventional Michelson interferometer. The calculated ratio of the minimum detectable phase change in the conventional Michelson interferometer and in the interferometer of the present invention is shown in FIG. 9 as a function of the phase difference φ between the interferometer's arms on a semi log scale. This calculation assumes a CCD with 16 bits quantization and 1024×1024 pixels.

The minimum detectable phase change in the interferometer of the present invention is, on average, 3-4 orders of magnitude smaller as compared with the Michelson interferometer, thus allowing the measurement of much smaller displacements. This ratio increases with the increase in the number of pixels in the camera.

In analysis associated with the description of FIG. 8, all noise sources were ignored except for quantization noise (i.e. limited number of bits per pixel). In practice, additional noise sources may impose a limit to the improvement achievable by the proposed approach. An accurate calculation of the device performances needs to be done per each given application when all noise sources are known and taken into account.

The following non-limiting and specific example takes into account other noise sources. An 8 bit camera with 1024×1024 pixels was used and the performance of the two interferometers (the interferometer of the present invention and a conventional Michelson interferometer) was compared (i.e. how close their phase change reading to the accurate phase change value) in the presence of a random noise source. In order to perform the comparison, for each phase difference φ, a phase step was added which is equivalent to 1/16 LSB plus a random noise, and the resulting intensity pattern was generated.

Figure 10A:
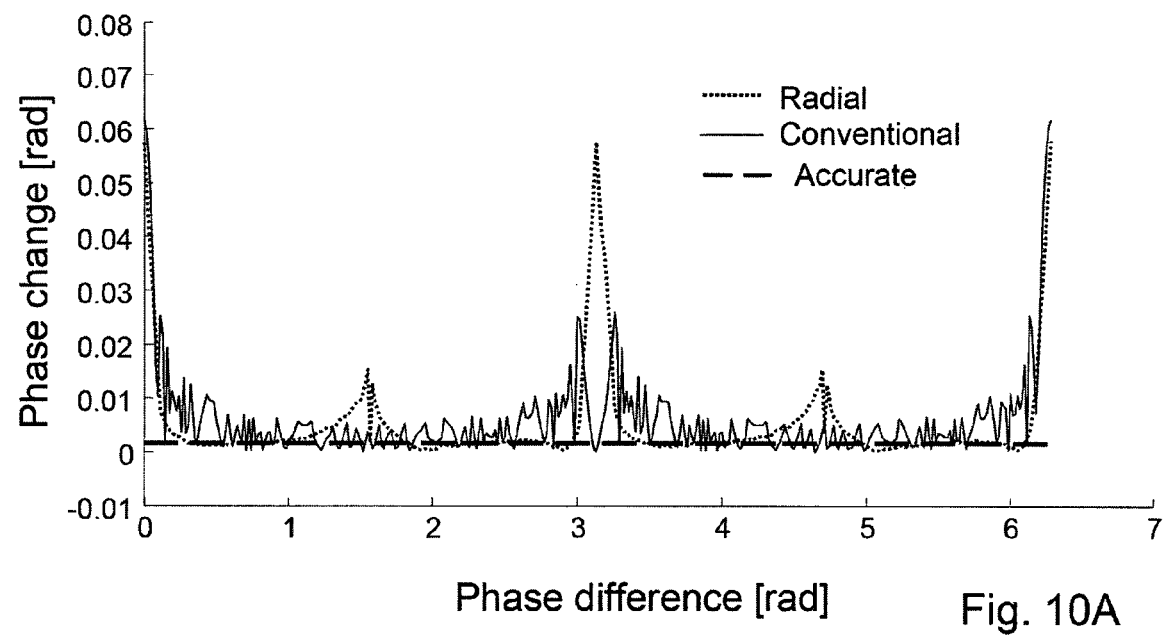
FIGS. 10A and 10B represent the phase change reading of the two interferometers as a function of the phase difference between the interferometer's arms; in particular
Figure 10B:
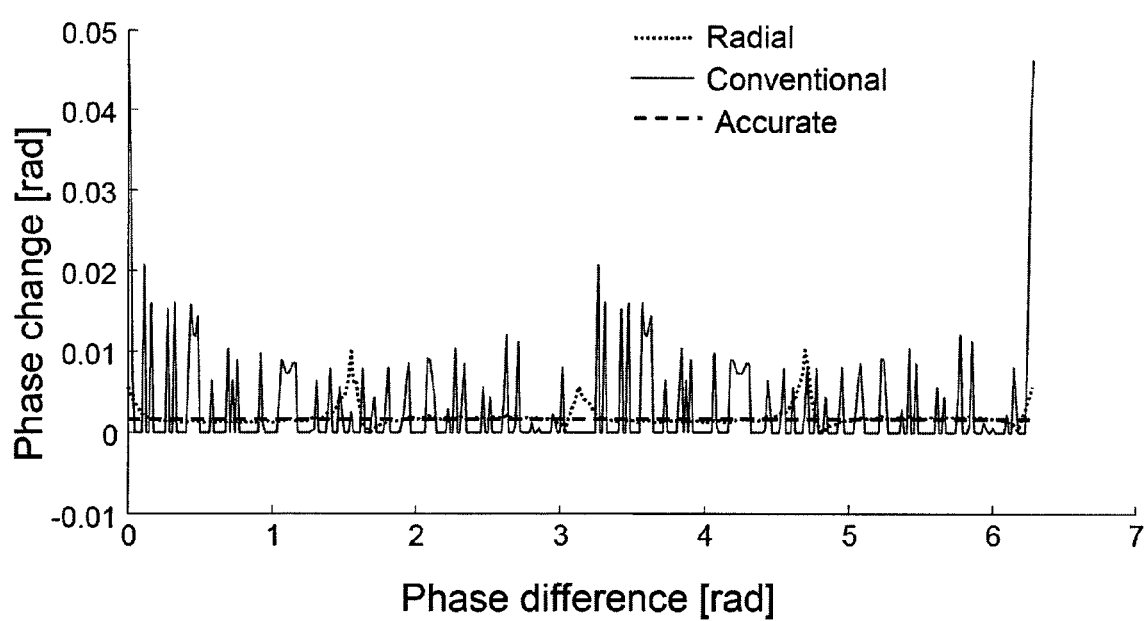

Using Eqs. (1) and (4) and the intensity change in each pixel, the phase change reading of each pixel was retrieved, and all pixels were averaged to get the final phase change reading of the interferometer. In this connection, reference is made to FIGS. 10A-10B showing the phase change reading of the two interferometers as a function of the phase difference between the interferometer's arms for noise amplitudes of 1 and 0.1 LSB, respectively. The accurate phase change value is shown as well for reference. As can be seen, for most phase difference values, the accuracy of the interferometer of the present invention is much better than the conventional Michelson interferometer.

When a noise of 1 LSB is assumed, the error of the interferometer of the present invention is smaller than that of the conventional Michelson interferometer in 67% of the cases. Within this range, the average error of the interferometer of the present invention is 7.46 times smaller than that of the conventional Michelson interferometer. In the remaining 33%, the error of the conventional Michelson interferometer is smaller than that of the interferometer of the present invention, although only by an average factor of 3.71. When a noise of 0.1 LSB is assumed, the results of the interferometer of the present invention improve providing smaller error in 92% of the cases. Within this range, the average error by using the interferometer of the present invention is 12.31 times smaller than that of the conventional Michelson interferometer. In the remaining 8%, the error of the conventional Michelson interferometer is smaller than that of the interferometer of the present invention, although only by an average factor of 1.56. Moreover, the error of the interferometer of the present invention is systematic, and thus can be pre-compensated, while the phase reading of the conventional Michelson interferometer oscillates sharply, making the pre-compensation more challenging.

While the interferometer of the present invention is mostly promising for translation measurements, it can also be used for retrieving the phase profile of a test object/sample that is inserted into one of the interferometer's arms. To demonstrate this capability, a case study was simulated in which a lens with a circular symmetric quadratic phase profile is inserted into one of the arms of the interferometer of the present invention. Considering the configuration of FIG. 1, such a lens constitutes a sample 204.

Figure 11B:
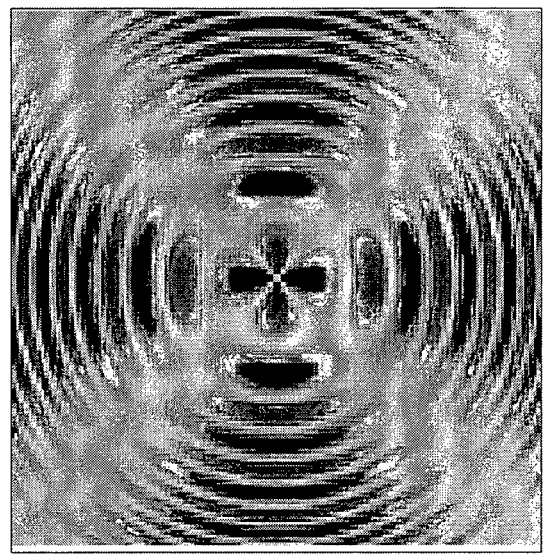
FIGS. 11A-11B represent interferograms generated by the CMI (FIG. 11A) and the interferometer of the present invention (FIG. 11B) when a lens with a circular symmetric quadratic phase profile is inserted into one of the interferometer's arms.
Figure 11A:
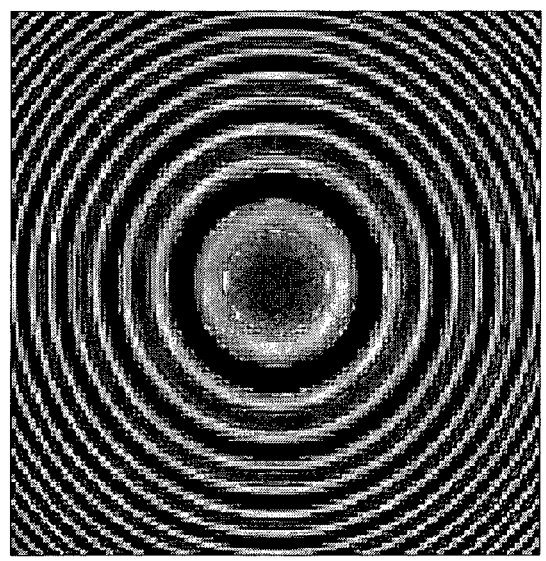

Reference is made to FIGS. 11A-11B showing the interferograms generated by the conventional Michelson interferometer (11A) and the interferometer of the present invention (11B) when a lens with a circular symmetric quadratic phase profile is inserted into one of the interferometer's arms.

It can be seen that the interferogram of the interferometer of the present invention has the same number of fringes as that of the conventional Michelson interferometer. Nevertheless, while the conventional Michelson interferometer fringes exhibit constant intensity along the azimuthal direction, the fringes of the interferometer of the present invention exhibit alternating intensity pattern along the azimuthal direction, following the $\cos(2\theta)$ dependency (Eq. 4). As a result, the paths along $\theta=0$ and $\theta=90°$ are flipped in their intensities. Therefore, by considering both paths for reconstructing the phase profile, it is possible to find an intensity minimum every $\pi$ phase shift along the radial coordinate, while in the conventional Michelson interferometer minimum intensity is obtained every $2\pi$ along the radial coordinate. This fact enables to reconstruct the phase profile of the test object/sample. This is because the detection of a small intensity change in a shot noise limited system is more accurate in the vicinity of a minimum than in the vicinity of a maximum, owing to the lower noise level.

Thus, the present invention provides a novel approach for various interferometry-based applications. The present invention provides for a two-dimensional representation of a phase difference between two interferometer's arms, thereby significantly improving the resolution of interferometric measurements.

Those skilled in the art will readily appreciate that various modifications and changes can be applied to embodiments of the invention as hereinbefore described without departing from its scope defined in and by the appended claims.

The invention claimed is:

1. An interferometer comprising:
an optical assembly, configured and operable to produce first and second spatially separated optical fields of incident coherent radiation of substantially the same intensity and different polarizations and to define first and second spatially separated optical paths for propagation of said first and second optical fields thereby allowing interaction between the first optical field and an element affecting a phase thereof in said first optical path, said optical assembly comprising a beam splitter/combiner for combining said first and second optical paths into a combined path at a location downstream of said element with respect to the optical fields' propagation through the interferometer;
a space-variant polarization converter accommodated in said combined path and being configured and operable to simultaneously apply space-variant polarization conversion to two beams corresponding to combined first and second optical fields having different polarizations and produce radially and azimuthally polarized beams respectively,
an analyzer downstream of said polarization converter, interaction of the radially and azimuthally polarized beams at the analyzer creating interference fringes corresponding to a spatially varying intensity pattern distribution indicative of a two-dimensional varying phase difference between the first and second optical fields propagating along the first and second optical paths indicative of interaction of said first optical field with said element.

2. The optical interferometer of claim 1, wherein said different polarizations are orthogonal polarizations.

3. The optical interferometer of claim 1, wherein said analyzer comprises a linear polarizer.

4. The optical interferometer of claim 3, wherein said analyzer is mounted for rotation in a plane substantially perpendicular to an axis of light propagation from the polarization converter to the analyzer, thereby allowing appropriate orientation of its plane of polarization.

5. The optical interferometer of claim 1, wherein said beam splitter/combiner is accommodated in an optical path of light input into the interferometer and is configured and operable to split said input light into first and second light components corresponding to said first and second optical fields.

6. The optical interferometer of claim 5, wherein said beam splitter/combiner is a polarization beam splitter/combiner.

7. The optical interferometer of claim 6, wherein the input light is unpolarized light.

8. The optical interferometer of claim 7, wherein the optical assembly comprises at least one polarizer unit comprising two polarizer elements, one of the polarizer elements being configured and operable to create a linear polarized beam and the other polarizer element being configured and operable to rotate polarization of the linear polarized beam an angle of 45° with respect to the linear polarization axis.

9. The optical interferometer of claim 5, wherein said input light is linearly polarized, the optical assembly comprising a polarizer element comprising a half wave plate oriented with its optical axis at 22.5° with respect to the polarization direction of the linear polarized light.

10. The optical interferometer of claim 1, wherein said input light is polarized light.

11. The optical interferometer of claim 10, wherein said input light is linearly polarized light.

12. The optical interferometer of claim 1, wherein said element affecting a phase of radiation passing therethrough comprises a sample to be inspected.

13. The optical interferometer of claim 1, comprising a reflective surface on said second optical path, said first and second spatially separated optical fields propagating along the first and second optical paths interact with respectively said element and said reflective surface, and are returned to propagate back along the first and second paths orthogonally oriented with respect to one another.

14. The optical interferometer of claim 13, wherein said reflecting surface is stationary mounted at a predetermined location in said second optical path.

15. The optical interferometer of claim 13, wherein said element sequentially affects a phase of said first optical field at successive planes of interaction with said first optical field at successive locations along the first optical path.

* * * * *